Feb. 21, 1933.   J. F. MULLANEY   1,898,382
STRAINER OR FILTER FOR FLUIDS, AS FOR MILK OR WATER
Filed May 29, 1930
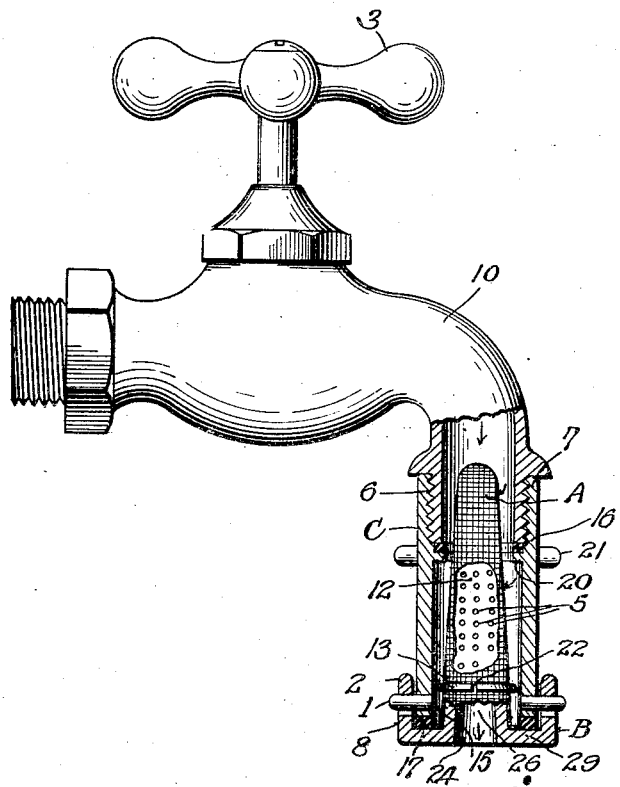
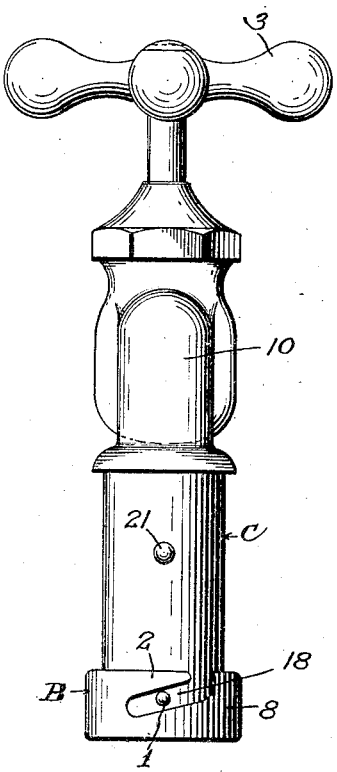
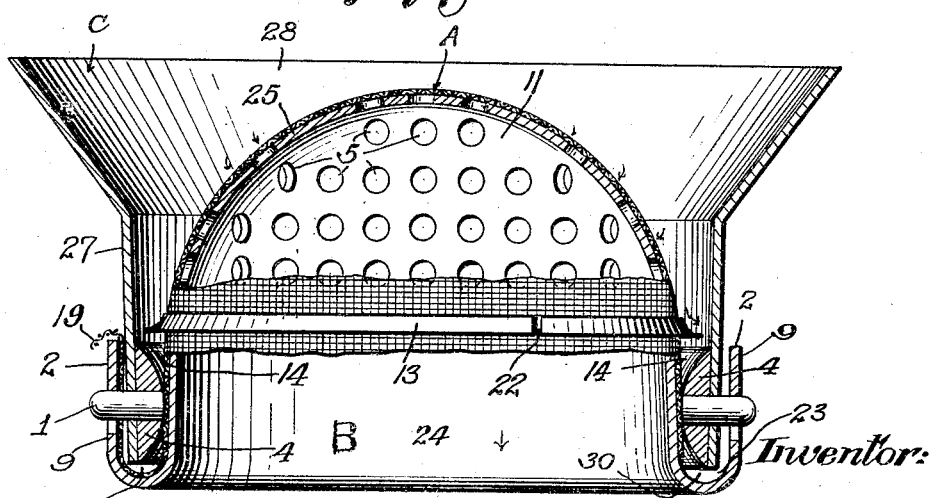
Inventor:
John J. Mullaney Patented Feb. 21, 1933

1,898,382

UNITED STATES PATENT OFFICE

JOHN F. MULLANEY, OF COLORADO SPRINGS, COLORADO

STRAINER OR FILTER FOR FLUIDS, AS FOR MILK OR WATER

Application filed May 29, 1930. Serial No. 456,970.

My invention relates to strainers for milk or other fluids in which the strainer or filter member is supported on a dome-like member so as to provide a trap at the base of the dome-like member for debris and germs or bacteria that adhere to the debris. My improvement provides means for readily assembling and disassembling the dome and filter member from its receptacle and also provides means, in the form of an inclined shielding ring for shunting the debris and adhering germs into the trap.

Figure 1 is a sectional elevation of a filter for faucets, with a partly sectional view of a faucet and showing the cone-shaped dome and trap construction upon the removable bottom; Fig. 2 is an outline elevation of a front view of the strainer member shown in Figure 1, and secured to the outlet end of a common faucet, and with the rest of the supply train removed, and showing the clamping means of securing the removable bottom; Fig. 3 is a sectional elevation of a modification of the strainer or filter as attached to the bottom outlet of a receptacle.

The removable bottom B, carrying the dome-shaped support 25, and the fabric strainer member A, in combination with the outwardly extending shielding ring 13, mounted together, with the re-enforced lower edge of member 27 of the container forming the trap recess 14 in Fig. 3, and trap recess 15 in Fig. 1, are the principal novelties in my invention:

The objects in straining milk or water by the use of this apparatus are to trap the débris, sediment and germs and bacteria that adhere to the débris or sediment, and while they so adhere to shunt them into said trap; also to trap from the desired fluids particles desired to be removed.

All living vegetable organisms naturally tend to adhere to solid or fibrous substances, whether they are trees, vegetables, parasites, saprophytes, bacteria or algæ, or else they form clusters of themselves. In that condition I arrest them from flowing through the filter member A, and shunt them down into the trap recess 14 or 15, before they disengage.

In Figs. 1 and 2 are shown a sectional elevation and a diagram respectively, of a filter or strainer for water or other liquid, as coming from a common faucet, as in a city water supply faucet, and this principle I am applying to straining of milk or other liquids also.

At 13 in Figs. 1 and 3, are shown the edge of the shielding rings around the fabric member A, and the conical-shaped dome 11, in Fig. 1 and the dome 11 in Fig. 3, and are placed just above their respective trap recesses 15 and 14, and are adapted to guard the débris and germs in said trap recesses from excessive agitation from incoming liquids that wash the débris down into said respective recesses. To aid in retaining the germs, said trap recesses are constructed very narrow and are provided with filaments, as of cloth or cotton fabric.

The removable member B is shown secured to member C, by clamping fingers 2, engaging the clamping lugs 1, projecting from the outer wall of the receptacle C. But may be secured thereto by other means not shown, as by friction.

To describe further, C represents the lower part of a milk strainer in Fig. 3, in section, in which 27 represents the upright part or foot of the receptacle, and 28 represents a part of the flaring part.

This part 27 is shown reinforced by a ring member 4 at its lower edge and adapted to fit tightly into the bottom of the trap recess 14 at 30. Said member 4 provides a stiffening to the part 27 and furnishes a secure base for lug 1, which is adapted to be engaged by a clamping finger 2 in Fig. 3, and similarly in Figs. 1 and 2, to secure the removable bottoms B, to the bodies C.

This mechanism is similar in Figs. 1, 2 and 3, as to principle but varied in construction only.

The filter member A is usually a cloth fabric, supported in a more-or-less acute dome-shaped or cone-shaped frame, or perforated unit, preferably integral with the member B, and having means securing it to the covvex surface of member C. The lower part 24, of said dome is imperforate so as to form a liquid-tight trap recess with the inner wall of the foot or upright part of 27 of member B, while the perforate part 12 in Fig. 1 and 11 in Fig. 3, of said domes extending above said traps and above the shielding rings 13, allows the liquid to flow through to the concave part of said domes and down through the outlet at their bottom.

Now, referring to Fig. 1, the faucet 10 is operated by means of the handle 3, and the gasket 16, which may be of rubber or other suitable material of annular shape and is placed upon the annular abutment flange 20, within the top part of receptacle C, Fig. 1, which is threadably secured to said faucet by means of threads 6 and 7, squeezing gasket 16, to a liquid tight condition. The grip-lugs 21 assist in grasping said member C firmly or in securing a wrench thereon.

Then another gasket 17 is placed in the bottom of 15, of Fig. 1, and then the filter member A is placed down over the cone-shaped dome 26, to below the perforate part 12, and the shielding ring 13 is placed as shown, where it can be adjusted by its elasticity by reason of the opening 22; then the member B is clamped upon the member C, and the strainer is ready to have the water turned on.

When the trap 15 needs cleaning the member B is removed and inverted against the current through member C and the greater part of débris will wash out. Usually it will be well to take out the member A and wash it. Ring 13 tends to hold A in place.

Nearly the same operation is required in the manipulation of the parts in Fig. 3. The holes 5 may be larger or smaller as required, or the domes may be a frame instead of perforated formed or cast metal. The domes may be more acute or more blunt as required. An end of the fabric strainer A is shown at 19, Fig. 3.

The upwardly extending flange 8 in Figs. 1 and 2, and the similar upwardly extending flange 9 in Fig. 3, on B, each are shown with a slot-way 18, adapted to receive registering lugs or bayonets 1 securely projecting from their respective receptacles C and adapted to adjustably secure together members or units B and C.

The numeral 28 represents a part of the flaring upper part of the receptacle, as of a milk strainer or a filter. The numeral 29, represents a place where a plugged hole may be formed to release débris without removing member B.

One of the advantages in this form of strainer is its condition when disassembled, being its ease of cleaning and its strength of construction.

Some laws forbid the re-using of the fabric filter member, and this form allows the substitution of a clean member A, with slight manipulation. There are but the three metal parts to disassemble and one is a ring. When disassembled free access is had to the sides of the trap recess, and all parts can be cleansed by suitable machinery.

There is no clogging of the strainer member A, as the inpouring cleanses it off, and you are not straining through the débris.

The flat strainer or the sagging strainer allows the bacteria to be strained or filtered down into the pure food, while the cleansed débris, as flies, is thrown away. Just the reverse of the desired scientific requirements of the present age. The flat strainer clogs and holds the débris until the bacteria are soaked loose and forced down into the milk or other precious fluid to be cleansed.

In the case of milk, this strainer being cleansed every time milk is put into it, allows the operator to use a closer filter cloth A, and yet it will strain faster than a flat clogged filter covered with débris and slime. This slime is often forced down into the milk with its bacteria for food for innocent children.

While Figure 3 shows but the bayonet form of fastening, I may use other means, as threads, and secure the base ring 4, to the outside of the receptacle foot 27 for threadable connection with flange 9.

Having thus described my invention, I claim—

1. In a filter of the class described for liquids and adapted to be threadably secured to the outlet end of a faucet, the combination comprising a receptacle member, an annular abutment within said receptacle member adapted to hold a gasket to prevent leakage, a gasket on said abutment in contact with said faucet, a cone-shaped supporting member with a dome-shaped top adapted to support a fabric filtering member, and having a multiplicity of perforations from its top to near its base, extending up into said receptacle, an outwardly extending flange integral with said supporting member and extending past under the bottom edge of said receptacle and thence extending upwardly on the outside of said receptacle and thus forming an annular recess adapted to receive an annular gasket and to receive the bottom edge of said receptacle, an annular gasket in said recess, a fabric filtering member covering said supporting member and extending down into said annular recess, a thin outwardly-inclined shielding ring mounted outside of said filter member at the upper edge of said trap recess zone and extending to near the inner wall of said receptacle, and adapted to shield the contents of said trap recess from excessive agitation, and means adapted to secure said annular gasket tightly against the bottom edge of said receptacle.

2. A filter of the class described, comprising in combination, a receptacle, a removable bottom therefore, a conical-shaped supporting shell extending from said bottom up into said receptacle and having perforations from its top to near its base leaving the lower one-third imperforate and forming a tight trap recess between the imperforate part and the concave wall of said receptacle, a fabric filter member covering said shell member and extending down into said trap recess, means for securing said bottom adjustably and tightly to the outer surface of the foot of said receptacle, and a thin outwardly inclined shielding ring mounted adjustably outside of said filter member and said shell member at the top of said recess and extending to near the inner wall of said receptacle and adapted to shield the contents of said trap recess from excessive agitation.

3. A filter of the class described comprising in combination, a receptacle, a removably secured bottom on said receptacle, an upwardly projecting dome-shaped shell member integral with said bottom and extending upwardly within said receptacle and having a multiplicity of perforations therethrough communicating with the outlet in the said bottom, the bottom part of said shell being imperforate part way up and forming a trap recess between its wall and the concave wall of said receptacle, an integral flange on said bottom extending outwardly under the bottom edge of said receptacle and thence upwardly and forming an annular recess adapted to receive the lower edge of said receptacle, an annular gasket between the bottom of said recess and the bottom edge of said receptacle, a fabric filter member covering said shell and extending down into said recess, a broad stiffening ring secured to the inside of the foot of said receptacle, projecting bayonet lugs extending through said ring and the side of said receptacle and projecting therefrom and adapted to engage the under edge of inclined clamping fingers on said flange to secure said bottom to said receptacle, and a thin outwardly extending shielding ring mounted around said filter member at the top of said trap recess and adapted to protect its contents from excessive agitation.

4. In a dome-and-trap filter for liquids, the combination with an outlet or supply pipe of a container secured to said pipe uprightly, an annular projecting flange or boss on the inner wall of said container near its intake end adapted to secure an annular gasket between its upper side and the under edge of said pipe, projecting lugs on the outer side of said container near its lower end, an annular-shaped bottom member for said container, an upwardly extending flange integral with said bottom member and adapted to extend upwardly on the outside of said container, horizontally extending clamping fingers formed integral with said flange and adapted to grasp said lugs to secure said bottom to said container, an upwardly-extending cone shaped supporting member integral with said bottom member and extending into said container and having a multiplicity of perforations from its top to near its base, the imperforate lower part of said supporting member forming a trap recess with the inner surface of said container adapted to receive débris, a filter member covering said supporting member and extending down into said trap recess, said imperforate part forming an annular outlet at the bottom, an annular gasket in the bottom of said trap recess and up against the lower edge of said container, and an annular gasket between said pipe and said boss, and a thin outwardly-extending shielding ring mounted about said filter member near the top of said trap recess and adapted to shield its contents from excessive agitation.

5. A filter of the class described having, in combination, an annular receptacle having an intake at its top and an outlet at its bottom, a bottom unit adapted to close said bottom outlet, means for removably securing said unit to said receptacle, an outlet provided in said unit, a dome-shaped support covering said last-named outlet and integral with said unit and having perforations in said unit from its top to near its base, an imperforate zone near its base and forming an annular trap recess between it and the wall of the receptacle, a fibrous filter member covering said support and having its lower edge secured between the bottom of said receptacle and the bottom of said recess, an annular gasket in the bottom of said recess, and an outwardly inclined shielding ring secured about said filter member near the top of said trap recess extending nearly over said recess to near the wall of said receptacle and adapted to protect the contents of said recess from excessive agitation.

6. A filter of the class described having in combination, a tubular receptacle having an inlet at its top and an outlet at its bottom, means for adjustably securing said receptacle to a faucet or similar outlet member of a liquid receptacle, an annular flange on the inside of said receptacle near its top adapted to support a gasket up against the lower edge of said outlet member or faucet, a bottom member adapted to close the outlet of said receptacle, means for securing adjustably said bottom member up against the bottom edge of said receptacle, a gasket secured between said bottom member and the lower edge of said receptacle, an outlet opening provided in the center of said bottom member and a spire-shaped supporting dome covering said opening and integral with said bottom and having perforations from its top to down near its base forming a means of communication from said receptacle to said opening, a fibrous filter member extending down over said dome to its bottom, the imperforate part of said dome near its bottom forming a trap recess adapted to receive débris, and a thin shielding ring secured elastically about said filter member just above said trap recess.

7. In a filter for separating débris, germs and sediment from milk or liquids, a receptacle having an intake at its top and an outlet at its bottom, a bottom unit having an opening centrally positioned, a dome-shaped supporting element having a multiplicity of smaller perforations extending from its top to an imperforate part near its bottom and covering said opening, to prevent direct flowing communication from said receptacle to said opening, a gasket secured between the lower edge of said receptacle and said bottom unit thus forming a tight recess trap for débris between said imperforate part of said dome-shaped element and said receptacle, means for securing said bottom unit to the bottom part of said receptacle adjustably, a fiber filter member covering said dome-shaped element, and an opening shielding ring secured about said filter member just above said recess trap adapted to secure its contents from unusual and excessive agitation.

JOHN F. MULLANEY.